United States Patent [19]
Brett

[11] Patent Number: 5,210,381
[45] Date of Patent: * May 11, 1993

[54] APPARATUS FOR GENERATING VIBRATIONAL ENERGY IN A BOREHOLE

[75] Inventor: James F. Brett, Tulsa, Okla.

[73] Assignee: Oil and Gas Consultants International, Inc., Tulsa, Okla.

[*] Notice: The portion of the term of this patent subsequent to Oct. 27, 2009 has been disclaimed.

[21] Appl. No.: 885,628

[22] Filed: May 18, 1992

Related U.S. Application Data

[63] Continuation-in-part of Ser. No. 704,805, May 23, 1991, Pat. No. 5,159,160.

[51] Int. Cl.$^5$ .............................................. G01V 1/40
[52] U.S. Cl. .................... 181/106; 181/113; 181/121; 73/151
[58] Field of Search ............... 181/106, 113, 121, 108; 73/151

[56] References Cited

U.S. PATENT DOCUMENTS 4,954,998  9/1990  Rector ................................ 367/82

Primary Examiner—J. Woodrow Eldred
Attorney, Agent, or Firm—Head & Johnson

[57] ABSTRACT

An apparatus for generating vibrational energy in a borehole including an elongated mass having a surface of diameter less than the borehole, a rotary source for suspending the cylindrical mass in a borehole and a system to cause frictional contact between the surface of the mass and the borehole wall, the cylindrical mass being rotatable about its rotational axis in one direction to cause the mass to backward whirl in the opposite direction within the borehole, the cylindrical force of the whirling mass serving to generate vibrational energy in the borehole.

39 Claims, 10 Drawing Sheets

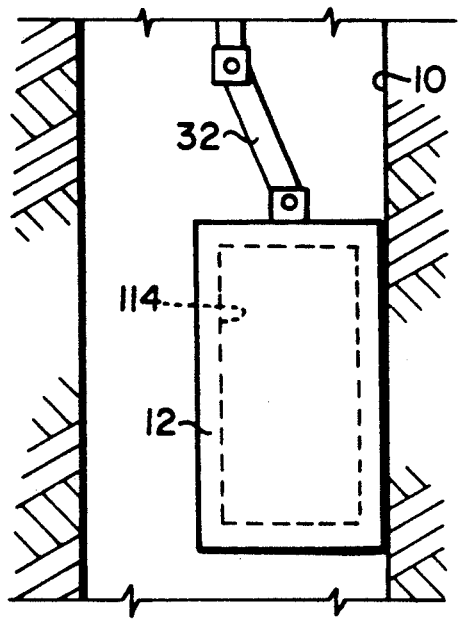
Fig. 27
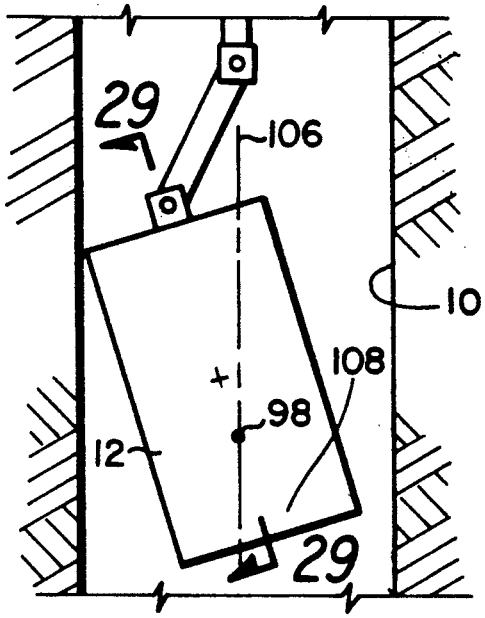
Fig. 28
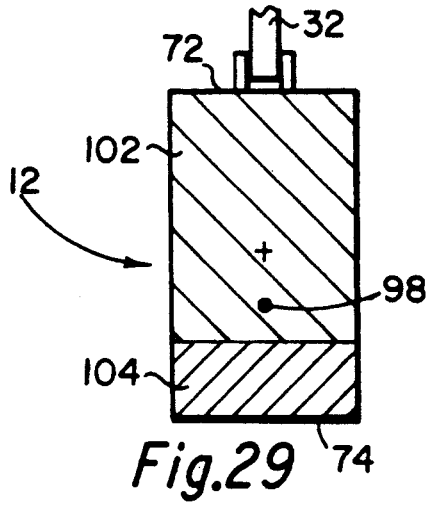
Fig. 29
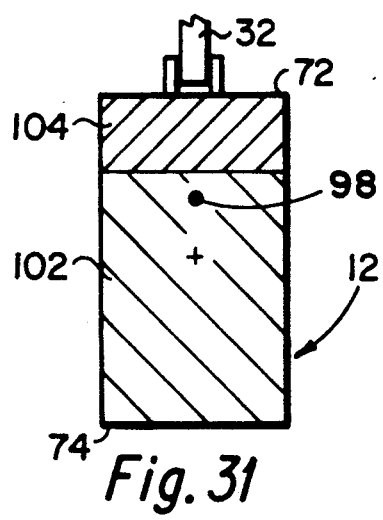
Fig. 30
Fig. 31

APPARATUS FOR GENERATING VIBRATIONAL ENERGY IN A BOREHOLE

This is a continuation-in-part of copending application Ser. No. 07/704,805 filed on May 23, 1991, now U.S. Pat. No. 5,159,160.

BACKGROUND OF THE INVENTION

The invention disclosed herein has the purpose of providing a powerful and controllable downhole vibrational energy source that can be used, in one application, as a seismic source that can function in either a cased or an open borehole. One of the problems with many previous downhole seismic energy sources has been their limited power. A seismic energy source with more power will allow fewer measurements to be taken to seismically characterize the subsurface, saving time and money. In circumstances where oil or gas well spacing is large, greater seismic energy power means greater range. The improved downhole seismic energy source of this disclosure will allow investigation of subterranean structure between wells that cannot be accomplished with presently available downhole seismic energy sources.

It is important that seismic energy be generated at a known and controllable frequency. The most powerful seismic energy sources currently available are limited in use to only cased holes. This limitation can make it difficult and expensive to use well borehole to well borehole seismic surveys in open boreholes. For these and other reasons, a more powerful and yet controllable downhole seismic source that can be used in either a cased or an open borehole is needed.

For information relating to others who have provided methods and apparatuses for generating downhole seismic energy, reference may be had to the following previously issued U.S. Pat. Nos. 3,718,205; 4,252,210; 4,671,379; 4,702,343; 4,722,417; 4,783,771; 4,796,723; 4,805,725; 4,805,727; 4,815,557; 4,834,210 and 4,856,614.

SUMMARY OF THE INVENTION

Basically, the downhole seismic energy source of this disclosure is a cylindrical mass that is caused to backward whirl about a borehole. Backward whirling motion is identical to the motion of a pinion rotating in an internal gear or that of a "spiro-graph" child's toy. One salient feature of the motion is that it creates very large centrifugal accelerations that allow a relatively small mass to create a very large force. For example, a 4.5" diameter steel mass 10' long, inside 5" ID casing will create about 24,000 pounds of sinusoidally varying force at 41.7 Hz when made to backward whirl by rotation at 250 RPM.

In the seismic energy source of this disclosure the power necessary to drive the backward whirling motion is provided by either a mechanical linkage to the surface, i.e. a string of tubing or dill pipe, or by a downhole motor, either electric, hydraulic or pneumatic. An electric motor offers the advantage of being finely speed controllable from the surface, but its power is limited by size constraints dictated by the borehole size. A hydraulic motor, on the other hand, can deliver 5 to 10 times more power per unit volume than an electric motor.

Systems required to maintain controllable rotational speed for electric or mechanical drive systems are well known in the art. A system to measure the frequency of the backward whirling seismic source used in combination with a downhole hydraulic motor is provided. To determine the position, velocity, or acceleration of the seismic source, an accelerometer can be placed on the motor near the cylindrical mass. This allows the drive frequency of the seismic source to be known through either electronic recording means downhole, or by transmission to the surface by acoustic telemetry, or via an electric conductor. This signal can then be used to control the speed of the driving motor and thus the frequency of the seismic source.

Control of a driving motor can be accomplished in a number of ways. The surface pumping rate of a positive displacement pump can be controlled to vary the pumping rate in response to the desired range of frequencies of the seismic source, which may be either constant or varying with time. A positive displacement pump can control the speed of a positive displacement downhole motor in proportion to the pump's speed. It is also possible to use a turbine or other type of downhole motor to drive the whirling cylindrical mass.

Even in cases where a positive displacement downhole motor is used as the drive source, it is possible that compressibility of the circulating fluid, uncertainties in the actual diameter of the borehole, leakage in the motor or pump, and pressure expansion effects in the tubing may prevent adequate control. In that case, a portion of the circulating medium can be shunted past the motor to provide a way to control the excitation frequency of the whirling cylindrical mass. The pump at the surface is controlled to provide a greater flow than necessary to achieve the desired excitation frequency, and this flow may change with time. The measured excitation frequency is then compared with a desired value. The measured frequency can either be transmitted from the surface or produced by downhole electronic systems, as is well known in the art. The downhole shunt valve is then operated to port fluid away from the positive displacement motor so as to maintain the measured excitation rate at the desired level. The downhole shunt valve may throttle fluid at the desired level. The downhole shunt valve may throttle fluid (i.e. act as a proportional control valve) or it may act in a fully opened or fully closed manner and to control the amount of fluid shunted past the motor by duty cycle modulation.

The outer surface of the whirling cylindrical mass can be controlled to create a high friction between the mass and either the borehole wall or the inside of a cased hole to promote development of the whirling motion. In a cased hole a high friction surface can be rubber with a tread that reduces any slipping tendencies due to fluid in the well. In an open hole operation the surface may have steel ribs, studs or such, in a rubber matrix to promote high friction between the side of the borehole and the whirling cylindrical mass.

The motor may be hung in the borehole with "slip" type elements so as to isolate the accelerations experienced by the whirling mass from the tubing string, in which case the use of a U-joint or flexible coupling is necessary. Such a hanging system can also be used in conjunction with the driver power being transmitted from the surface by the tubing string. In this case the hanging system can have a gearing system to change the rotational speed of the drive string to a speed that is optimum to drive the whirling cylindrical mass.

A "starter spring" system can be used to ensure that the whirling cylindrical mass is in contact with the borehole or the sidewall of a casing. A starter system ensures that a self-regenerative whirling motion begins in every circumstance. Basically, the starter system biases the position of the cylindrical mass to one side of the borehole or casing so that contact is ensured to allow an initial force to be created between the mass and the borehole wall. After rotation is initiated the regenerative nature of backward whirling motion ensures that frictional contact is continued. The starter system can be constructed to be retracted when whirling motion is started.

In one embodiment of the concept, the whirling cylindrical mass is never actually in contact with the borehole or casing. In this embodiment, the whirling mass acts as a pinion and the "contact" gear is an internal gear that is anchored in the open borehole or casing by means of "slips" or other systems. This embodiment has the advantages of eliminating the need to create friction between the whirling cylindrical mass and the borehole wall, ensures a known diameter of whirl, and also provides greater contact area so that less stress is placed on the borehole.

The downhole seismic energy source of this disclosure is different than an eccentric mass in several important ways. First, an eccentric mass must be rotated at its excitation frequency. This means that higher speed motors are required to achieve practical excitation frequencies. With the whirling cylindrical mass of this disclosure, however, the physics of whirling itself magnifies the frequency of excitation. This means that lower speed downhole motors can be used as a power source. Second, an excitation force of an eccentric mass must be transmitted through some kind of drive shaft. This means that the forces possible are limited due to physical stress limits in practical sized drive shafts. With a whirling cylindrical mass, however, the excitation force is supported by the borehole itself. This means that much greater excitation forces are possible.

When a mass is rapidly rotated in a borehole vibrational energy is not generated unless the mass backward whirls within the borehole. That is, it is necessary that the rotating mass have frictional contact with the borehole and unless and until such frictional contact is established, the rotating mass will not produce vibrational energy.

Various means are presented in the following specification for achieving frictional contact between a rotating mass and a borehole. One example of a system for causing the surface of a mass to establish frictional contact with a borehole wall is to provide frictional enhancing surfaces on the rotating mass. Frictional enhancing surfaces may be placed adjacent to the top or the bottom of an elongated mass or, if the mass is barrel shaped, the frictional enhancing surface can be in a band around the middle or larger diameter portion of the mass. Another method is to add a flexible elastomeric member of increased external diameter to the mass. The flexible member engages the borehole wall as the mass is rotated to initiate backward whirl. The flexible member will collapse so as to permit full contact of the surface of the mass with the borehole wall after backward whirl is achieved.

A further means of encouraging frictional contact between the mass and the borehole wall is to off-center the mass, such as by forming the mass of portions having different densities or locating the point of pivotation away from the rotational axis of the mass. The mass can also be made of non-circular cross-section as another way of increasing the frictional contact between the mass surface and the borehole.

To urge the mass towards the borehole sidewall so as to establish frictional contact a linkage member by which the mass is supported and rotated may be biased outwardly by a torsional spring.

Frictional imparting elements may be slidably secured to the mass, such as on the top surface and urged outwardly by a spring. These frictional elements first encounter the borehole sidewall as the mass is rotated to start the backward whirling action. Once backward whirling has initiated the frictional elements are moved inwardly as the mass is urged outwardly by centrifugal force so that the full external surface of the mass engages the borehole wall as the mass backward whirls.

An important feature of this invention is a system for creating vibrational energy in a borehole that can be expeditiously positioned into or removed from the borehole. A rotary source can be lowered into a desired position in a borehole by means of a wireline. Electrical signals controlled from the earth's surface can be used to extend arms from the rotary source to engage the borehole sidewall to thereby maintain the rotary source in a non-rotated position. A flexible coupling extending from a rotating shaft at the lower end of the rotary source can then be used to connect to a mass that is rotated to achieve backward whirling action within the borehole. When vibrational energy is no longer required, the arms can be retracted and the entire system removed by the wireline.

Another embodiment includes a tubular housing of diameter less than the internal diameter of the borehole. The housing can be lowered into a borehole on a wireline. The housing includes a rotary source, such as a motor, having a shaft. A flexible coupling attaches the shaft to a rotating mass. The rotating mass backward whirls within the interior of the tubular housing to create vibrational energy. Expandable slips on the exterior of the housing serve to maintain the housing in non-rotational relationship with the borehole and to transmit vibrational energy from the housing to the borehole.

The concept of generating a vibrational signal downhole, such as for use for seismic purposes, can be achieved by a system that is positioned within the interior of a drill pipe. For this application all components of the system must be of diameter that is less than the internal diameter of the drill pipe. A backward whirling mass within the interior of a drill string can be used to create vibrational energy that is transmitted to the earth surrounding the borehole. In this manner, vibrational energy, such as for use as a seismic signal, can be established in a borehole without the necessity of pulling the drilling string from the borehole.

The whirling mass can be arranged to have a smaller diameter portion and a larger diameter portion in the areas that contact the borehole wall. The different diameter portions of the mass create different whirl rates, and the different whirl rates cause the mass to apply varying centrifugal forces to the borehole sidewall. In some instances, the forces applied by the smaller and larger diameter portions of the mass are applied to the same side of the borehole sidewall, while at other times the forces of the larger diameter portion of the mass are applied to the borehole sidewall at 180 degrees relative to the force of the mass applied by the smaller diameter portion. The use of a mass having a larger and a smaller diameter portion provides a more complex vibrational signal which may have applications for particular geophysical processes.

The backward whirling mass of this disclosure operating in a borehole provides a source of seismic signals. The signals radiate in the earth. By placement of geophones at remote locations, such as in an adjacent borehole or on the earth's surface or a combination of the two, much information can be procured as to the rate of travel and the reflection of the seismic signals. Upon analysis of the receipt of the seismic signals by the geophones, a geophysicist can then learn much about the structure of the earth surrounding the borehole and the structure of the earth in the area between the borehole at the point where the seismic signals are generated by the backward whirling force and the earth's surface or the adjacent well. The seismic signals are received, preferably by a plurality of geophones either at the earth's surface or at an adjacent borehole or both, and the received signals recorded and analyzed. The analysis of the received signals resulting from the seismic signals created by the backward whirling mass can be carried out at the site or preferably at a location having the resources, including adequate computer technology, for analyzing the received signals resulting from the seismic energy generated by the backward whirling mass so as to provide information as to the geophysical structures surrounding the borehole.

A better understanding of the invention may be obtained with reference to the following description, taken in conjunction with the attached drawings.

DESCRIPTION OF THE DRAWINGS

In FIG. 25 the mass is fully concave, with the point of pivotation is adjacent to the lower end of the mass but within the mass concavity.

FIG. 27 shows a mass in the process of backward whirling within a borehole. In this embodiment the mass is hollow so that the weight is concentrated in the cylindrical periphery. This arrangement permits the force generated to be independently controlled from the whirl frequency and from the mass link which can control the starting tendencies.

FIG. 28 is a diagrammatic view of a mass being rotated and in which the center of gravity is in the lower portion of the elongated generally cylindrical mass and in which a band having a frictional engaging surface is formed on the top of the mass to augment backward whirling.

FIG. 29 is a cross-sectional view taken along the line 29—29 of FIG. 28 showing that the mass is formed of a light material in the upper portion thereof and a heavy material in the bottom portion so as to shift the center of gravity toward the bottom of the mass.

FIG. 30 is a diagrammatic view as in FIG. 29 with the center of gravity shifted toward the top of the mass and the friction enhancing band on the exterior surface being positioned at the bottom of the mass.

FIG. 31 is a cross-sectional view taken along the line 31—31 of FIG. 30 showing the construction of the mass having heavier material in the upper portion and lighter material in the lower portion so that the center of gravity is shifted towards the top of the mass.

FIG. 36 shows the rotary source positioned within the borehole and held there by expandable arms and with the mass being rotated to backward whirl within the borehole.

DESCRIPTION OF THE PREFERRED EMBODIMENTS

Figure 1:
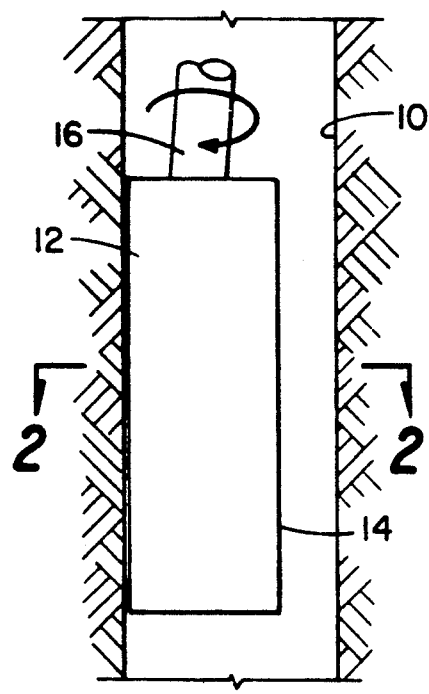
FIG. 1 is a basic view of the apparatus for practicing the principles of this invention in the form of a cylindrical mass rotated in a borehole, the mass being in contact with the borehole so that as it is rotated, the mass migrates in the direction opposite of rotation around the borehole to create large centrifugal forces.

Referring to FIG. 1, the basic concept of this invention is illustrated diagrammatically and is illustrated for use in an open borehole. The concept of FIG. 1 can also be used in a cased borehole. A borehole 10 extends from the earth's surface, as drilled in the usual manner for drilling oil or gas wells. The object of the present invention is to generate a seismic energy signal, that is, to generate pressure wave signals that travel in the earth and that can be detected by geophones placed on the earth or in adjacent boreholes. Through the science of seismology the detected seismic waves can be analyzed to provide geologists with important information concerning the structure through which borehole 10 traverses and the structure surrounding the borehole.

Positioned within the borehole is an elongated cylindrical mass 12 having an external cylindrical or nearly cylindrical surface 14. The external surface 14 could be rough or have ribs or other non-cylindrical features. The mass is rotated by a rotational means 16 in a manner to be described subsequently. Cylindrical surface 14 is in contact with borehole wall 10.

Figure 2:
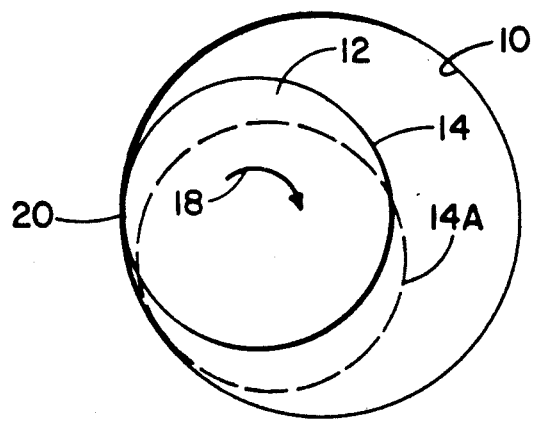
FIG. 2 is a cross-sectional view taken along the line 2—2 of FIG. 1 showing the cylindrical mass in cross-section and illustrating how the mass whirls within the borehole to create centrifugal force.

FIG. 2, a cross-sectional view of FIG. 1, illustrates the concept of this disclosure. Assuming cylindrical mass 12 is rotated clockwise in the direction indicated by arrow 18, the mass, due to frictional contact with the borehole wall, will migrate or "backward whirl" in a counterclockwise direction, that is, the direction opposite of that of arrow 18. After an incremental time the mass will take the position as indicated by 14A. The mass will continue to rotate in a counterclockwise direction, whirling around the interior of borehole 10.

Assuming no slip at the contact point 20 between external surface 14 of the cylindrical mass and borehole wall 10, the whirling mass will contact each point on the borehole wall, such as at point 20 at a frequency rate according to the formula:

$$f = \frac{D}{P} (RPM) \frac{1}{60}$$

Where "f" is the excitation frequency is Hz;
Where "Dw" is the diameter of borehole 10;
Where "RPM" is rotations per minute;
Where "P" is the difference in the diameter of the borehole 10 and the diameter of the cylindrical mass 12 (P=Dw−D);
Where "D" is the diameter of the cylindrical mass 12.

As an example, if cylindrical mass 12 has a diameter of 4.5 inches and borehole 10 has a diameter of 5 inches or, instead, if the borehole is the interior of a casing, a sinusoidal varying force at 37.5 Hz will be created by the backward whirl of the cylindrical mass when it is rotated at 250 RPM.

The contact force of cylindrical mass 12 against each point of contact with borehole wall 10 is expressed according to the formula:

$$Fc = (.0000141)D^2 \frac{RPM^2}{P} (W)$$

Where "Fc" is the force of contact;
Where "W" is the weight of the cylindrical mass.
The centrifugal acceleration in "g's" of the whirling mass is determined by the formula:

$$.0000141 \frac{D^2 RPM^2}{P}$$

If in the example given above wherein cylindrical mass 12 is 4.5 inches in diameter and is formed of steel and is 10 feet long, and with a diameter of borehole 10 equaling 5 inches, at 250 RPM the whirling mass would create about 19,440 pounds of sinusoidal varying force at 37.7 Hz.

Figure 3:
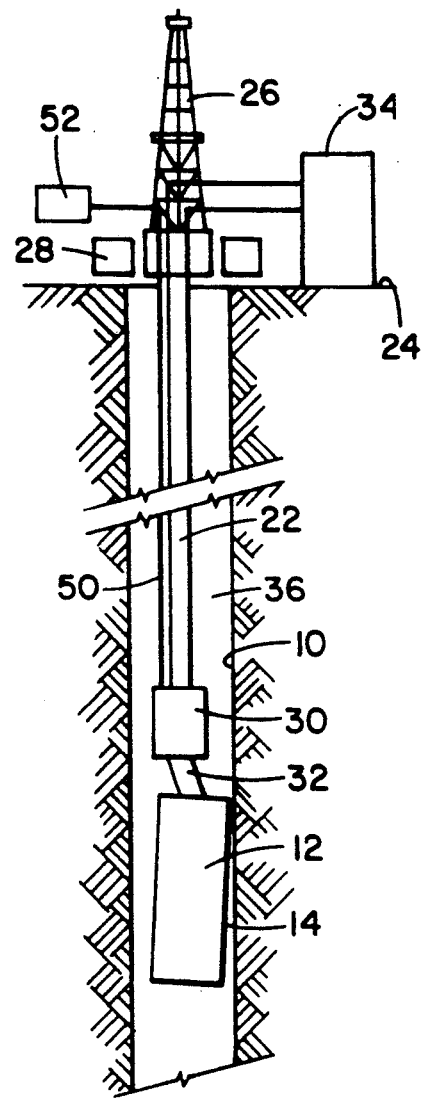
FIG. 3 is a diagrammatic elevational view of a borehole extending from the earth's surface showing an apparatus for use in applying rotational energy to the cylindrical mass.

FIG. 3 shows more details of the typical application of the concepts of FIGS. 1 and 2. Positioned within borehole 10 is a tubing string 22 extending from the earth's surface 24 and suspended by a surface system 26 of the type typically employed for drilling or working over an oil or gas well. The surface system 26 may include a source of rotary energy 28 of the type such as used for rotating a drill string during drilling operations which may be adapted to be rotated at higher speeds. By rotating tubing 22 cylindrical mass 12 can be rotated to generate a seismic energy signal in the method as previously described.

Figure 4:
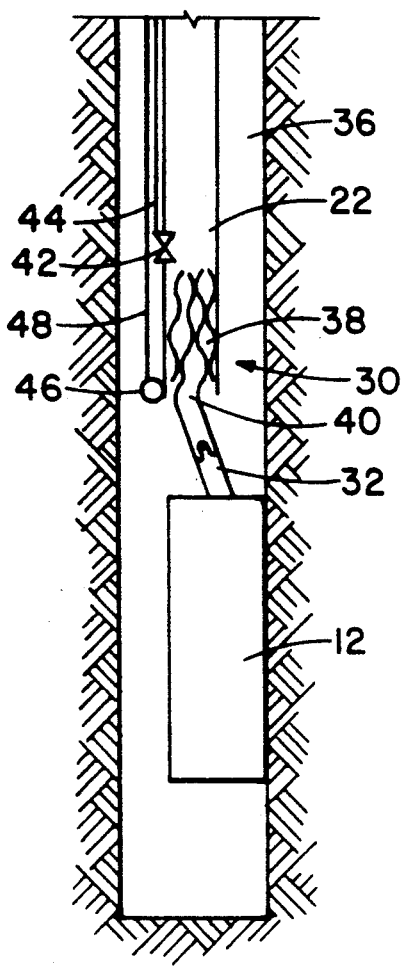
FIG. 4 is another elevational diagrammatic view of the subsurface portion of the borehole showing a type of positive displacement downhole pump that may be used for applying rotational energy to a centrifugal mass.
Figure 39:
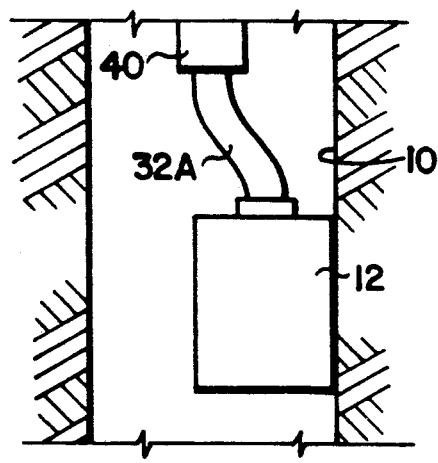
FIG. 39 is an elevational view of a mass for backward whirling in a borehole similar to that which is illustrated in FIGS. 1, 2 and 6. The mass is rotated by a flexible shaft which functions to transmit rotational torque to the mass but which permits the mass to freely deviate away from alignment with the rotational energy source to fully impact the borehole sidewall.

Instead of rotating tubing string 22 a rotary power source 30 may be suspended by the tubing string and connected to cylindrical mass 12, such as by means of a coupling member 32. The rotary power source 30 may be an electric power, either DC or AC, or a downhole hydraulic motor. When the rotary power source is a downhole hydraulic motor, a source of hydraulic power 34 is provided at the earth's surface and connected to tubing string 22 by which fluid under pressure is forced downwardly through the tubing to the rotary power source 30. The fluid passes out of the rotary power source and into the well annular area 36 and back to the earth's surface. FIG. 4 shows one means of providing a rotary power source 30 of the hydraulic type. In this type, the rotary power source is a positive displacement downhole motor 38 affixed to tubing string 22. The motor 38 has a shaft 40 connected to coupling member 32 that may be in the form of a flexible coupling or universal joint by which the rotary energy from positive displacement motor 38 is coupled to cylindrical mass 12. FIG. 39 illustrates a flexible shaft 32A extending from motor shaft 40 to mass 12 to transmit rotary torque to the mass but which permits the mass to freely backwards whirl in contact with the sidewall of borehole 10.

As fluid is forced down the interior of tubing string 22, it passes through the positive displacement motor 38, causing shaft 40 to rotate, the fluid returning in the annular area 36 back to the earth's surface. In some applications it may be important to control the RPM of the whirling cylindrical mass 12 so as to control the frequency of the seismic energy signal being generated. This can be accomplished in a variety of ways. In one way as illustrated in FIG. 4, a shunt bypass valve 42 is positioned in communication with the interior of tubing string 22 above the rotary power source 30. By means of a conductor 44 extending to the earth's surface, electrical signals may be applied to shunt bypass valve 42 to control the opening and closing of the valve. When valve 42 is opened, or partially opened, some of the hydraulic fluid flowing downwardly through tubing string 22 is diverted directly into the well annulus 36 and therefore does not flow through positive displacement motor 38. Therefore, it can be seen that by bypassing a portion of the fluid flow the rotary force generated by positive displacement motor 38 can be altered, to thereby alter the RPM of rotation of cylindrical mass 12.

Another way of controlling the RPM of cylindrical mass 12 when rotated by a positive displacement motor, as illustrated in FIG. 4, is by controlling at the earth's surface the rate of fluid output of the hydraulic power source 34, as shown in FIG. 3. Thus, in summary, the rate of rotation of cylindrical mass 12 and therefore the frequency of the seismic energy signal can, when the power source is hydraulically actuated, be controlled by means at the earth's surface or downhole to achieve the desired frequency of the seismic energy signal.

To determine the frequency of the seismic signal generated by the whirling cylindrical mass 12 an accelerometer 46, or other frequency sensing device, may be affixed to the lower end of the tubing string or on the whirling mass. By a conductor 48 extending to the earth's surface a signal can be delivered to indicate to operators at the earth's surface the frequency of the signal so as to be able to control the frequency to obtain that which is desired.

Referring back to FIG. 3, as previously stated, rotary power source 30 may be an electric motor supplied by electric energy over cable 50 extending to the earth's surface and connected to a source of electrical power 52.

Figure 5:
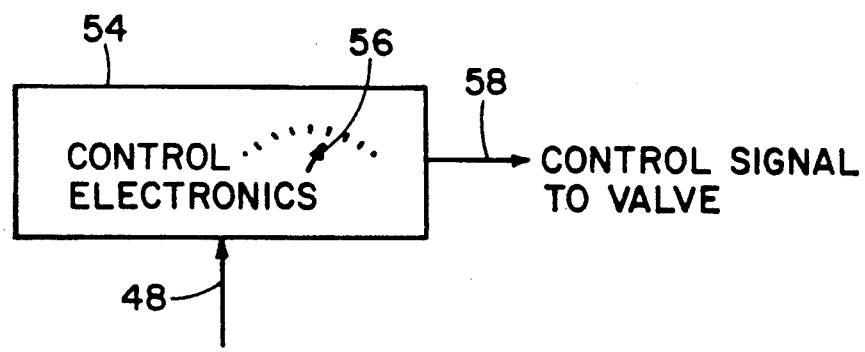
FIG. 5 is rudimentary diagram of means for controlling the rate of rotation of a centrifugal mass so as to produce seismic energy signals having a desired frequency characteristic.

As referenced in FIG. 4, the measured frequency of the seismic signal generated by whirling cylindrical mass 12 can be detected by accelerometer 46. FIG. 5 shows a means of using such detected measurement to attain the desired frequency of the seismic energy signal. The measured signal appears on cable 48 as previously described. This signal is fed to control electronics 54 having a frequency selector 56 input by which the desired frequency of the required seismic signal is selected. The selected frequencies could change with time. The control electronics 54 compares the desired frequencies selected at 56 with the detected frequency appearing on conductor 48 and generates an output signal at 58 that can be connected, such as to conductor 44, to control shunt valve 42. Alternatively, output signal 48 can be used to control the source of hydraulic power 34 as shown in FIG. 3. Where rotary power source 30 is electrically operated, control signal 58 may be used to control either the voltage, if the rotary power source is a DC motor, or the frequency of the power signal if the rotary power source is a AC motor.

Figure 6:
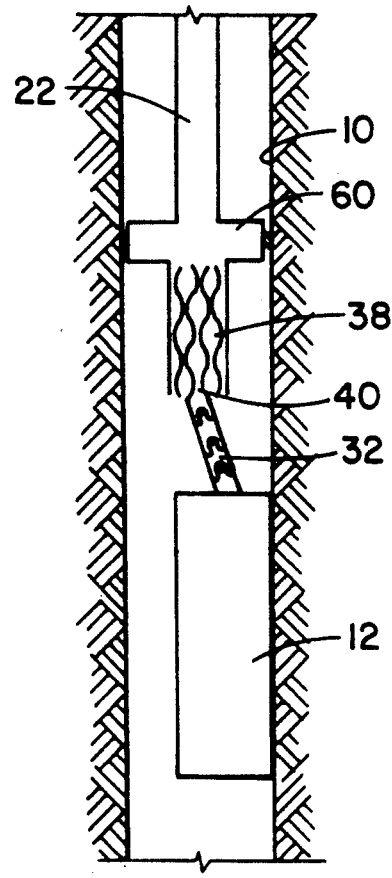
FIG. 6 is an elevational view of the downhole portion of a borehole showing diagrammatically the use of a borehole anchoring means for anchoring the motor used for rotationally driving the cylindrical mass.

With tubing string 22 suspended in a borehole or a casing as shown in FIG. 3, and with a rotary power source 30 at the lower end of tubing string it can be seen that the tubing string would be subject to substantial vibration as power is applied to rotate cylindrical mass 12. An alternate arrangement is illustrated in FIG. 6 which shows a lower end portion of borehole 10 with tubing string 22 extending from the earth's surface. Positioned at the lower end of tubing string 22 is a borehole anchor means 60. This may be in the form of slips or a hydraulic mechanism as is commonly employed in the oil and gas well drilling industry. The rotary power source, such as positive displacement motor 38, is supported below borehole anchor means 60. Flexible coupling member 32 extends from the positive displacement motor shaft 40 to connect to the whirling cylindrical mass 12. Thus, the borehole anchor means serves to anchor the lower end of tubing string 22 to prevent undue vibration of the tubing string as the whirling cylindrical mass 12 is rotated. It is also possible to have motor 38 positioned above anchor means 60 with shaft 40 extending through the anchor means to connect to flexible coupling member 32.

Figure 7:
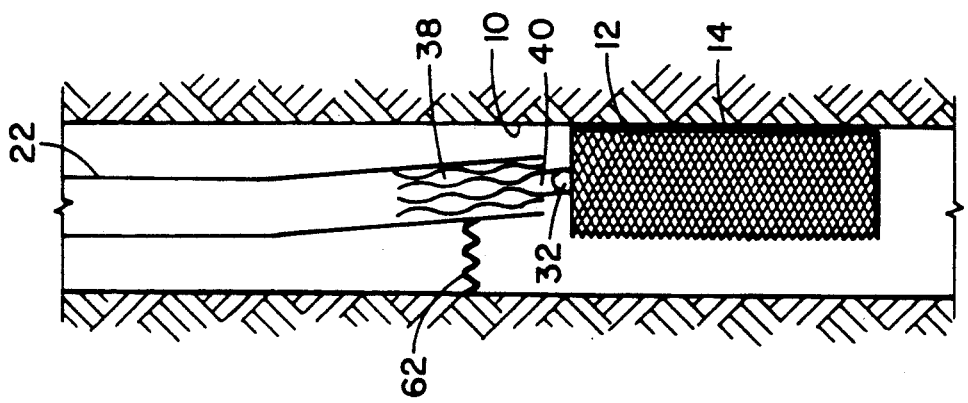
FIG. 7 is a diagrammatic view of a downhole mechanism for practicing the invention showing a spring bias means for urging the cylindrical mass into frictional contact with the borehole sidewall so that, when the mass is rotated, it will migrate in a whirling motion within the borehole.

In order for the whirling cylindrical mass 12 to rotate within the borehole or casing, cylindrical surface 14 must be in frictional contact with borehole wall 10, or the wall of the casing if operated within a casing. It can be seen that if the cylindrical mass is merely rotated within a borehole, no frictional contact is established between the rotating mass cylindrical surface and the interior of the borehole, that is, the mass will not whirl within the borehole to create a seismic source. For this reason, as illustrated in FIG. 7, a biasing force, exemplified by a bias spring 62, may be employed. The function of bias spring 62 is merely to hold cylindrical mass 12 so that cylindrical surface 14 is in frictional contact with borehole wall 10. In this matter, when rotary energy is applied to cylindrical mass 12 it will migrate in a direction opposite of its direction of rotation around borehole wall 10. Once the whirling migration is initiated the centrifugal force applied by the rotating cylindrical mass is such as to sustain the frictional engagement of the cylindrical mass with the wall. The only time the biasing force, as exemplified by biasing spring 62, is required is at the initiation of the rotation of the cylindrical mass to make sure that it is in frictional contact with borehole 10 and once the rotation is initiated, biasing spring 62 is no longer required.

In order to increase the frictional contact of the whirling mass 12 with borehole 10, the whirling mass cylindrical surface 14A may be roughed, ribbed or otherwise provided with a pattern, such as protruding diamond shaped projections as shown in FIG. 7. This arrangement reduces slippage between the surface of whirling mass and the borehole so that the backward whirl of the mass occurs at a more predictable rotational rate.

Figure 8:
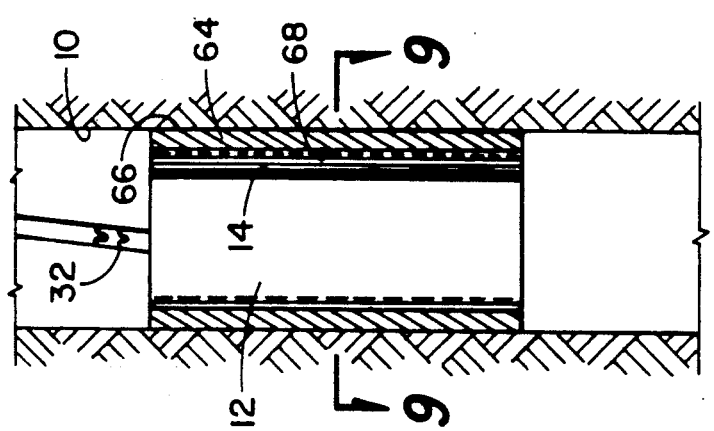
FIG. 8 is a diagrammatic view of the subsurface portion of a borehole showing a cylindrical mass positioned within the borehole and showing mounted in the borehole a tubular base member against which the cylindrical mass rotates, the tubular base member having an internal cylindrical surface arranged to provide improved frictional engagement between it and the cylindrical mass sidewall.

Another means to increase the frictional engagement of rotating cylindrical mass 12 with the interior of the borehole and thereby provide a more certain whirling diameter is illustrated in FIG. 8 which shows the employment of a tubular base member 64. The external cylindrical surface 66 of the tubular base member fits in close contact with borehole 10. Tubular base member 64 may include a wall anchor system that may be hydraulically or mechanically actuated, such as to anchor the tubular base member to borehole 10. The tubular base member 64 may be made of hard rubber, polyurethane or other material that provides an interior cylindrical surface 68 having a high co-efficient or friction surface. With tubular base member 64 properly positioned within borehole 10, cylindrical mass 12 will whirl with less slippage as it is rotated.

While tubular base member 64 may be a smooth high friction interior surface 68 an alternate arrangement, as illustrated, includes the provision wherein the tubular base member includes a tubular contact gear member 70 having teeth 72 on the interior cylindrical surface. The exterior cylindrical surface 14 of cylindrical mass 12 is likewise provided with teeth 74 that mesh with the teeth 72 on the tubular contact gear member.

Figure 9:
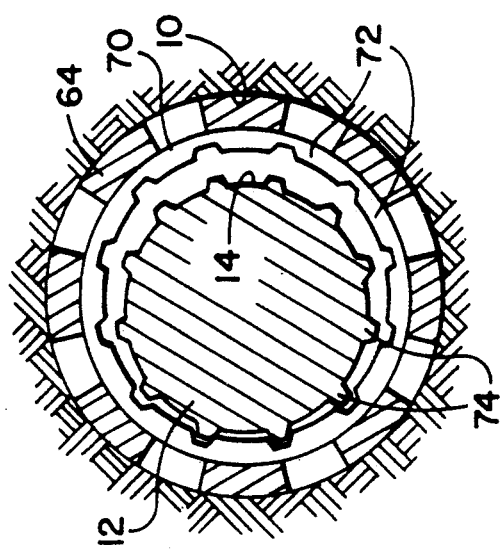
FIG. 9 is a cross-sectional view as taken along the line 9—9 of FIG. 8 showing the arrangement wherein the tubular base member has internal teeth therein and wherein the cylindrical mass has externally extending teeth, the teeth meshing so that the cylindrical mass is rotated as it whirls within the tubular base member in a gear-like arrangement.

In the embodiment of FIG. 9, the rotation of cylindrical mass 12 will take place as teeth 74 mesh with teeth 72 on the tubular contact gear member 70 so that no slippage of the cylindrical mass relative to the borehole can occur.

Tubular base member 64 may include a wall anchor system that may be hydraulically actuated, such as to anchor the tubular base member to borehole wall 10.

Thus, the system of this invention provides a relatively inexpensive means of achieving a high intensity seismic energy signal in an open or cased borehole. The high energy is achieved since the borehole itself, or if operated within a casing the casing itself, forms an integral part of the energy system. That is, the whirling cylindrical mass transfers energy into the earth via the tubular base 64 so that maximum energy transfer of the seismic signal is obtained without the possibility of damaging the integrity of the well borehole.

When a mass is rotated within a borehole it is necessary that frictional contact between the mass and the borehole be established before backward whirling can be achieved. Various means may be employed for augmenting or initiating the frictional engagement of a mass with a borehole and examples of these are illustrated in FIGS. 10 through 26 and 28 through 35.

Figure 10:
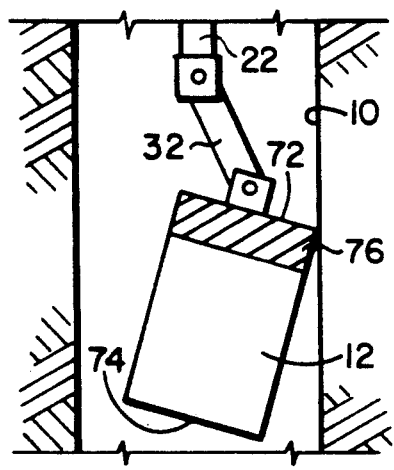
FIG. 10 is a diagrammatic view of a generally cylindrical elongated mass supported for rotation in a borehole. The mass is rotationally supported by a pivotal linkage. To increase frictional contact between the mass and the borehole to initiate backward whirling a friction enhancing surface band is formed adjacent to the top of the mass.

In FIG. 10 the mass 12 is elongated and of a generally cylindrical configuration. The mass has a top 72 and bottom 74. Positioned on the external surface adjacent the top is a textured frictional enhanced area 76 that, when engaged with borehole sidewall 10, increases frictional relationship to thereby initiate backward whirling of the mass.

Figure 11:
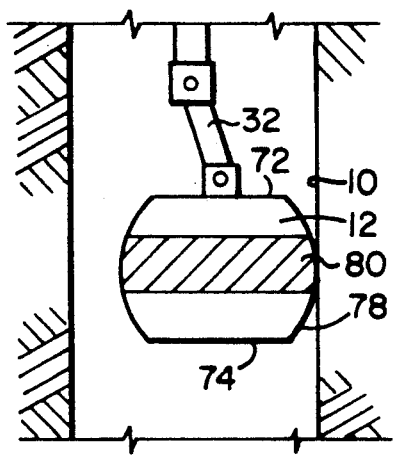
FIG. 11 is a diagrammatic view of a mass having a general barrel shape external configuration, that is, the mass is of a larger diameter in the middle than at the upper and lower ends. A band of friction enhancing surface band if formed on the exterior of the mass at the enlarged diameter portion spaced intermediate the mass upper and lower ends.

FIG. 11 shows an arrangement wherein mass 12 has a barrel shaped external peripheral surface 78 that is of larger external diameter than the diameters adjacent top 72 and bottom 74. This increased diameter surface portion is provided with a textured frictional enhanced band 80 that engages borehole sidewall 10 to initiate backward whirling.

Figure 12:
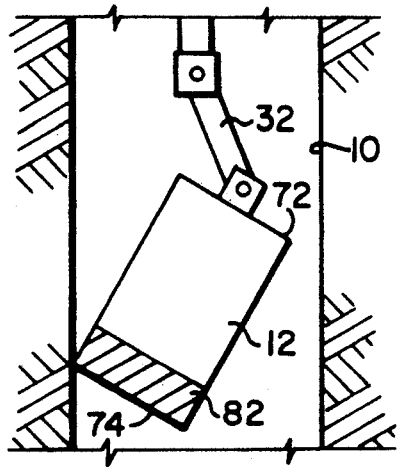
FIG. 12 is a diagrammatic view as in FIG. 10 but showing the friction enhancing surface in a band spaced near the bottom of the mass to initiate backward whirling as the mass is rotated.

FIG. 12 is an embodiment as shown and described with respect to FIG. 10 except that the textured frictional enhanced band 82 is positioned adjacent mass bottom 74.

Figure 13:
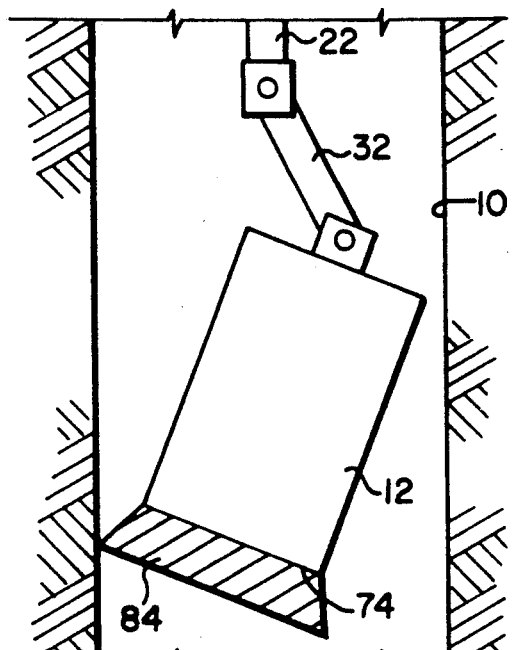
FIG. 13 is a diagrammatic view of an alternate embodiment of the mass including a flexible oversized frictional enhancing element affixed to the bottom of the mass. This element extends out to contact the borehole sidewall as the mass is rotated to initiate backward whirling.
Figure 14:
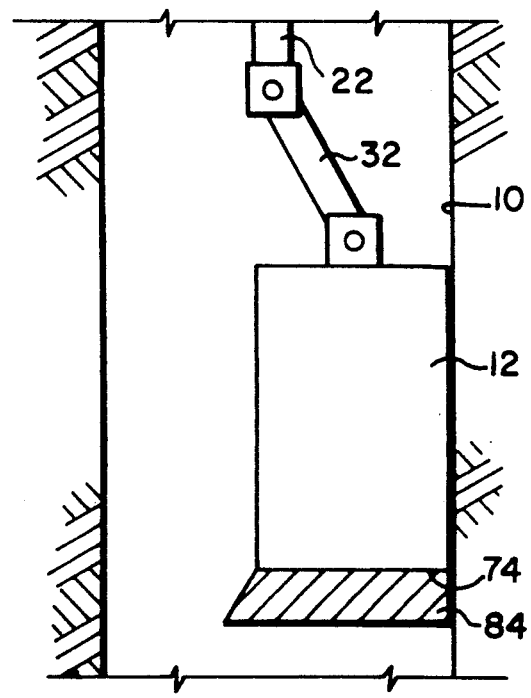
FIG. 14 shows the embodiment of FIG. 13 as the mass is backward whirled against the borehold sidewall, the centrifugal force serving to compress the flexible friction enhancing element to permit full contact of the mass external surface with the borehole sidewall.

FIGS. 13 and 14 show another way of establishing frictional contact between the mass and the borehole sidewall. Affixed to bottom 74 of mass 12 is a circumferential elastomeric member 84 made such as of rubber or deformable plastic. The elastomeric member 84 is of a diameter greater than that of mass 12 so as to augment engagement with borehole wall 10. Once frictional engagement with the borehole is established the rotating mass starts to backward whirl and centrifugal force moves the mass continually outwardly against borehole wall 10 to compress elastomeric member 84 where the mass engages the borehole wall as shown in FIG. 14. This permits the full peripheral surface of the mass to engage the wall for maximal vibration energy generation.

Figure 16:
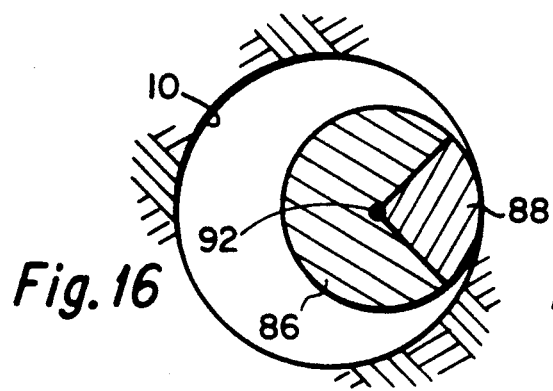
FIG. 16 is cross-sectional view taken along the line 16—16 of FIG. 15 showing that the elongated generally cylindrical mass is formed of heavier and lighter portions so that the mass is off balance, that is, so that the center of gravity is displaced from the rotational axis of the mass to cause the mass to be displaced as it is rotated to augment frictional contact with the borehole sidewall.
Figure 15:
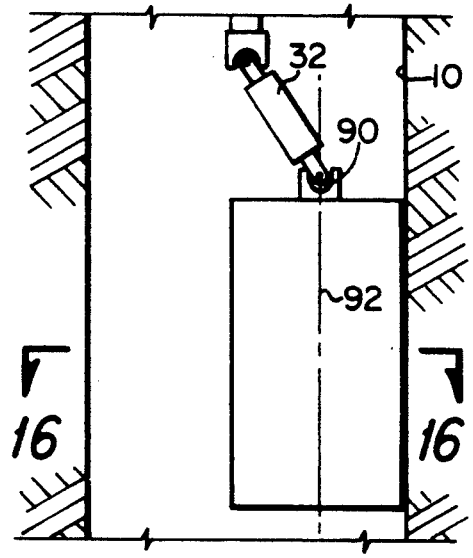
FIG. 15 is a diagrammatic view of a generally cylindrical mass supported in a borehole by a flexible linkage.

FIGS. 15 and 16 show an alternate means of causing the mass, once rotation is initiated, to contact the borehole sidewall so as to start backward whirl. As shown in FIG. 16, a cross-sectional view, the mass is formed of two portions, that is a lighter weight portion 86 and a heavier weight portion 88. Due to the difference in specific gravities of portions 86 and 88, the mass will wobble as rotation is initiated even though the point of pivotation 90 is coincident with the mass rotational axis 92. As the mass wobbles frictional engagement with the borehole is enhanced.

Figure 17:
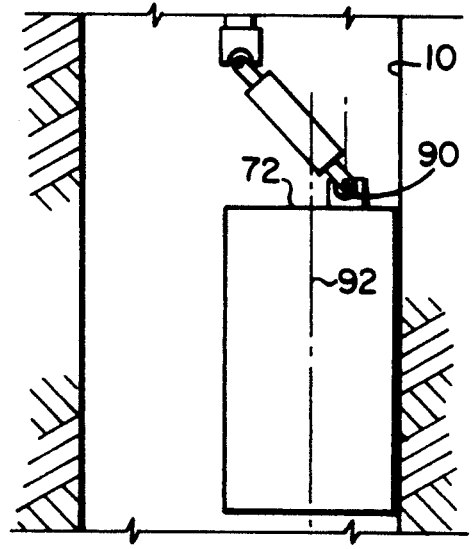
FIG. 17 is an elongated generally cylindrical mass as shown in FIG. 15 but wherein the point of pivotation is off-set from the rotational axis of the mass. This off-set causes the mass to wobble as rotation is initiated to increase the likelihood of the mass engaging the cylindrical wall to initiate backward whirling.

FIG. 17 shows how a similar result can be accomplished. The point of pivotation 90 at top 72 is off-set from the mass axis of rotation 92. This off-set will cause the mass to be unbalanced and to wobble as it is rotated and therefore more quickly engage the borehole sidewall.

Figure 19:
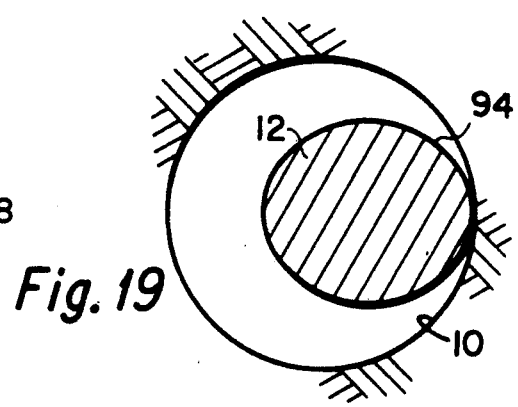
FIG. 19 is a cross-sectional view taken along the line 19—19 of FIG. 18 showing that the mass is of a generally elliptical cross-sectional configuration such configuration that enhances the frictional engagement of the external surface of the mass with the borehole sidewall as the mass is rotated.
Figure 18:
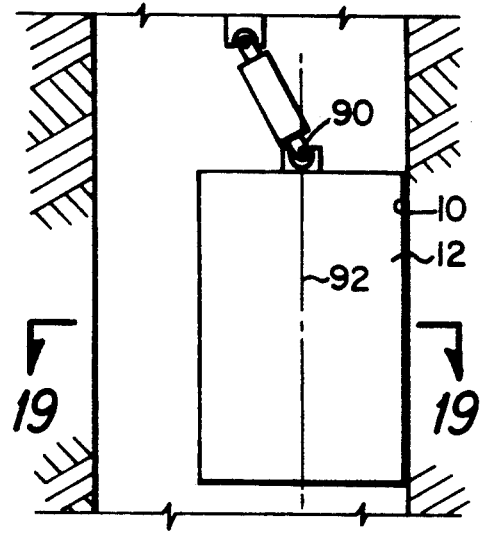
FIG. 18 is an elongated mass as illustrated in FIG. 15.

FIGS. 18 and 19 show another means of achieving increased frictional contact between rotating mass 12 and borehole sidewall 10. As shown in FIG. 19 the mass is non-cylindrical and, as illustrated, is elliptical. Other cross-sectional configurations may be utilized so that the mass is non-circular. As the mass whirls the non-circular external configuration causes changing centrifugal force of the mass with the borehole sidewall. This not only increases the frictional engagement between the mass and the borehole sidewall but also increases the vibrational energy caused by the backward whirling mass. The elliptical external configuration of the mass is indicated by the numeral 94.

Figure 20:
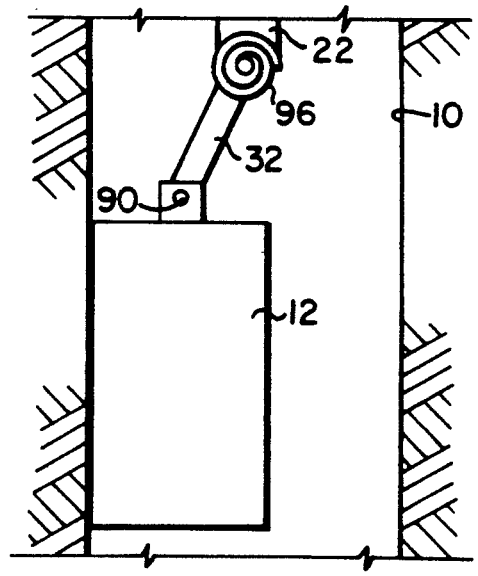
FIG. 20 shows is a diagrammatic elevational view of a mass supported in a borehole by pivotal linkage extending from a rotational shaft. At the point where the linkage is pivotally attached to the rotational shaft a torsional spring is employed to urge the mass to extend at an angle with respect to the rotational shaft to thereby cause the mass to more effectively frictionally engage the borehole sidewall to initiate backward whirling.

In FIG. 20 mass 12 is shown supported by linkage 32 extending from rotational shaft 22 as previously described. Linkage 32 is attached to the mass at a point of pivotation 90 and is inclined at an angle with respect to shaft 22 to urge the mass into contact with borehole sidewall 10. This is accomplished by use of a torsional spring 96 interposed between rotational shaft 22 and linkage 32. With all of the various embodiments that have been described for augmenting frictional contact between the rotating mass and the sidewall of a borehole so as to initiate backward whirl it must be understood that once backward whirl is established the means of initiation becomes irrelevant or at least of very secondary significance. In FIG. 20 the torsional spring 96 is no longer a factor once backward whirl is initiated because of the enormous centrifugal forces that develop compared to the force of spring 96. The only function of spring 96 is simply to initiate initial frictional contact so as to cause backward whirl to begin.

Frictional contact can be established when a mass is rotated in a borehole if the mass is unbalanced in some way so as to cause it to wobble out of inline rotation. Wobbling action will cause at least a portion of the mass to move out to engage the borehole sidewall to initiate frictional engagement. Once frictional engagement is initiated the centrifugal force resulting from backward whirl augments the frictional contact so that normally all that is required to cause backward whirl is a trigger mechanism to initiate frictional contact between the rotating mass and the borehole sidewall. FIGS. 21 through 33 show various means of achieving this frictional contact initiation by unbalancing the rotating mass to cause it to selectably wobble as it is rotated.

Figure 21:
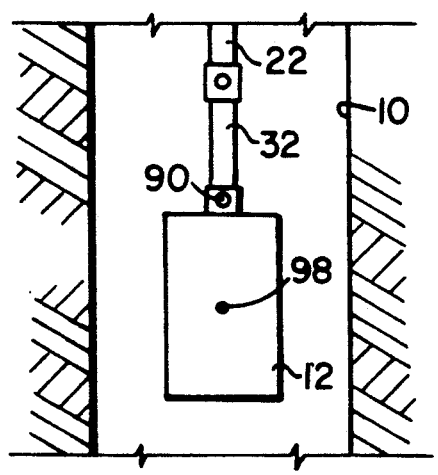
FIG. 21 is a diagrammatic view of a mass positioned within a borehole, the mass being supported from a rotational shaft by means of a linkage and in which the center of gravity of the mass is below the point of pivotation.
Figure 22:
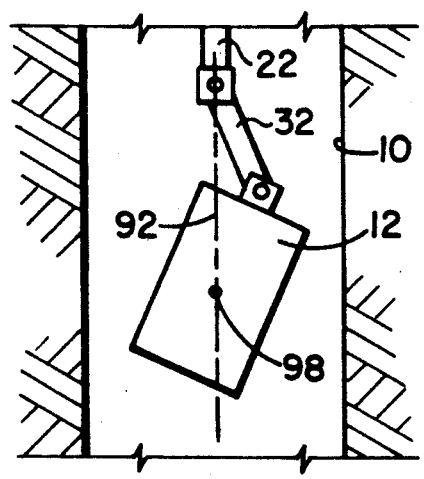
FIG. 22 shows the arrangement of FIG. 21 with the mass being rotated. The elongated mass will tend to tilt as it is rotated and such tilting increases the likelihood of the mass contacting the borehole sidewall to establish frictional contact to start backward whirling.

In FIG. 21 the center of gravity 98 of mass 12 is below point of pivotation 90 of linkage 32. Since the center of gravity 98 is displaced below the point of pivotation 90, there is a tendency for the mass to wobble as it is rotated as indicated in FIG. 22. This wobbling causes portions of the mass to be displaced outwardly to contact borehole sidewall 10 and initiate backward whirl.

Figure 23:
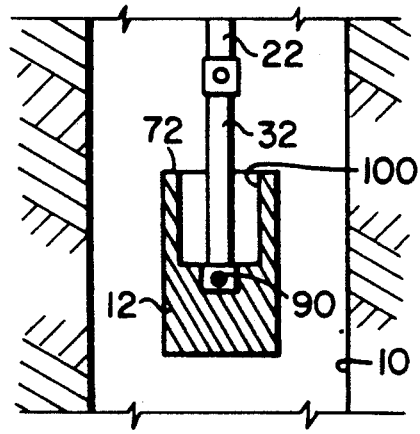
FIG. 23 is a diagrammatic view showing the mass supported by a linkage extending from a rotational shaft with the mass shown in cross-section. In this arrangement a deep cavity is formed in the upper portion of the mass so that the point of pivotation of the linkage with the mass is within the cavity and therefore is displaced below the top of the mass.
Figure 24:
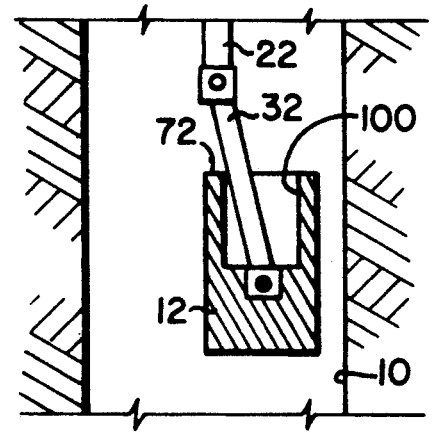
FIG. 24 shows the arrangement of FIG. 23 with the mass being rotated. The mass is shown as it appears after having established frictional contact with the borehole sidewall and is rotating in a backward whirl with the mass external elongated peripheral surface fully engaging the borehole sidewall.

FIGS. 23 through 26 show a rotating mass having a concave area 100 formed in top 72 of the mass. The point of pivotation 90 is moved downwardly as shown in FIG. 23, within the concavity 100, and the concavity permits linkage 32 to extend at the angle required so that mass 12 translates without tilt to engage borehole sidewall 10 as shown in FIG. 24.

Figure 25:
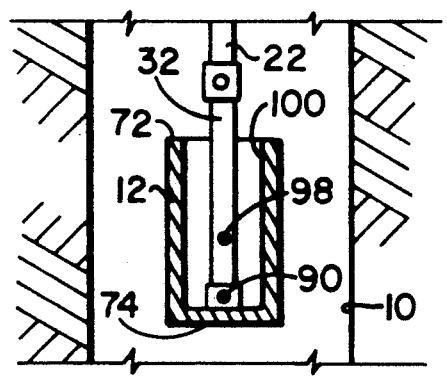
FIG. 25 is a further evolution of the arrangement of FIGS. 23 and 24.
Figure 26:
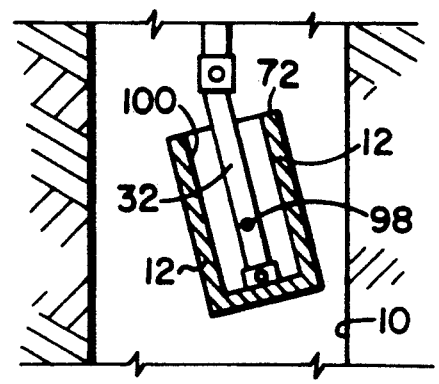
FIG. 26 shows the embodiment of FIG. 25 being rotated. The configuration of the mass causes it to tilt upon rotation to thereby engage the borehole sidewall to initiate backward whirl.

In FIG. 25 concavity 100 is deepened so that point of pivotation 90 is near mass bottom 74. As shown in FIG. 26, this causes the mass to tilt as it is rotated to engage borehole sidewall 10.

As shown in FIGS. 28 and 29, the center of gravity 98 of the mass may be shifted toward its top or bottom to cause the mass to tilt as it is rotated. In FIG. 29 the upper portion 102 is formed of light material and heavy material is used for the bottom portion 104. This causes the center of gravity 98 to shift towards the bottom and consequently the mass will tilt as it rotates about center of gravity 98. As shown in FIG. 28, vertical axis 106 extends through the center of gravity 98 as the mass is initially rotated. However, once backward whirling starts, rotational axis 106 becomes coincident with the geometrical axis of the mass since it is held against the borehole sidewall by centrifugal force. In FIG. 28 a textured frictional enhanced band 108 is applied on the exterior surface of the mass near the bottom.

Figure 32:
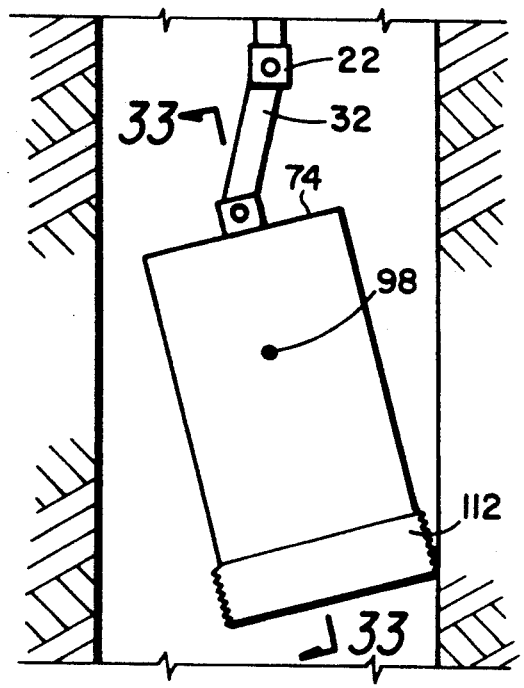
FIG. 32 is another embodiment of the mass shown diagrammatically and as it is rotated in a borehole. In this embodiment the center of gravity of the mass is near the top, whereas a band of frictional enhancing surface is applied adjacent the bottom of the mass.
Figure 33:
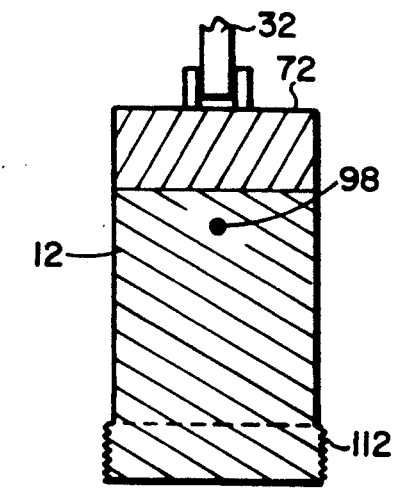
FIG. 33 is a cross-sectional view as taken along the line 33—33 of FIG. 31 showing that the mass is formed of a heavy material and a light material with the heavy material being adjacent the top and with the band of friction enhancing surface being formed at the bottom of the mass.

FIGS. 30 and 31 are like FIGS. 28 and 29 except heavier component 104 is near top 72 and the lighter component 102 is at bottom 74 to cause the center of gravity 98 to shift to adjacent top 72. In the embodiment of FIG. 30 the band of textured frictional enhanced area 110 is placed near top 72 of the mass. FIGS. 32 and 33 show the same arrangement as FIGS. 30 and 31 except that the band of enhanced frictional engaging surface 112 is placed at the bottom while the center of gravity 98 is adjacent the mass top 74.

FIG. 27 shows an alternate embodiment of the invention. In this example mass 12 is elongated and generally cylindrical but, unlike the other embodiments, is hollow, that is, it has a hollow interior 114. This hollow interior concentrates the bulk of the weight of rotating mass 12 at the circumference of the mass. The hollow mass allows the force generated to be independently controlled from the whirl frequency. Further, the length of the mass can control the starting tendencies, that is, the longer the mass the more likely it will be unbalanced and wobble as rotation is initiated and such wobbling will result in a portion of the mass contacting the borehole wall to initiate backward whirl. As previously stated, once backward whirl is initiated it is self regenerative as the centrifugal force increases frictional contact of the mass external surface with the wall.

Figure 34:
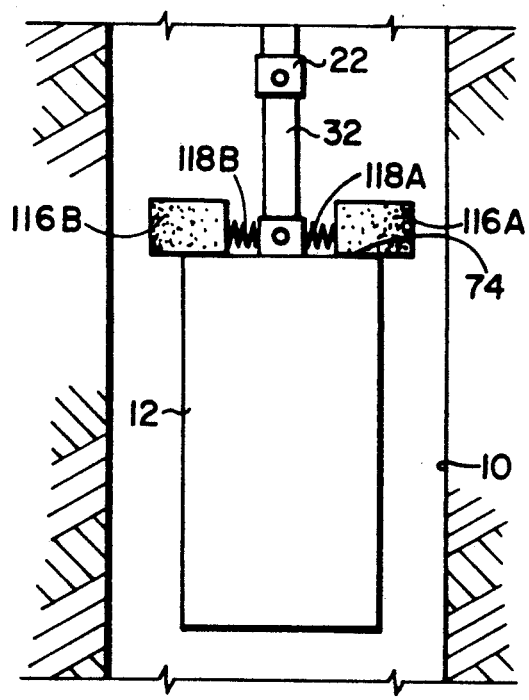
FIG. 34 is an elevation diagrammatic view of a mass supported in a borehole and in which the mass has displacable mechanical friction enhancing elements on the top thereof, the elements being urged outwardly for contact with the borehole sidewall.
Figure 35:
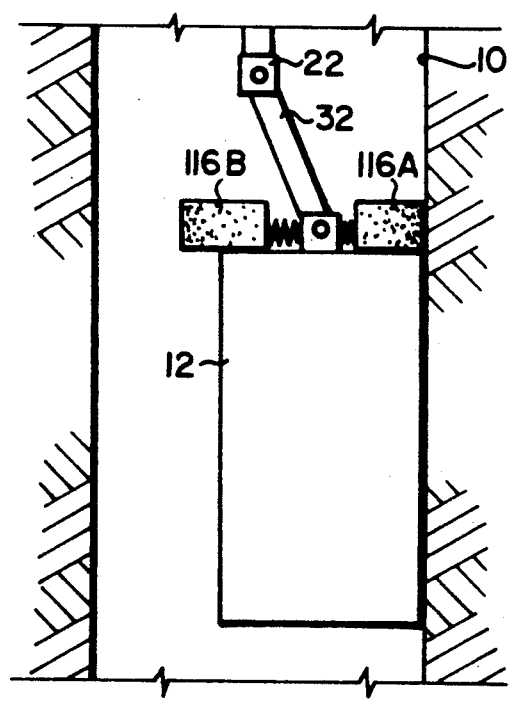
FIG. 35 is the embodiment of FIG. 34 as the mass is rotated. As the centrifugal force urges the mass to rotate against the borehole sidewall the frictional elements are displaced inwardly so as to permit full contact of the mass sidewall with the borehole.

FIGS. 34 and 35 show another means of initiating backward whirl. Mass 12 has at top 74 thereof a plurality (two being illustrated in the external elevational view) of frictional elements 116A and 116B. The elements 116A and 116B are affixed to slide inwardly and outwardly, that is, radially, with respect to the axis of rotation of the mass, or the frictional elements 116A and 116B may be affixed to hinge so that they can expand inwardly or outwardly relative to the mass. The elements are urged in their outward direction by means of springs 118A and 188B so that they extend beyond the external periphery of mass 112. The externally extending frictional elements readily engage the interior of borehole sidewall 10 as the mass is rotated to initiate backward whirl.

FIG. 35 shows the relationship of the elements when backward has been attained. The centrifugal force of the backward whirling mass forces it against borehole sidewall 10, displacing inwardly the frictional element contacting the wall so that the entire external surface of mass 12 engages the borehole wall. The basic concept of the arrangement of FIGS. 34 and 35 is the same as that of FIGS. 13 and 14 except that in FIGS. 13 and 14 an elastomeric member is employed, whereas in the embodiment of FIGS. 34 and 35 moveable structural elements are utilized to initiate backward whirl.

Figure 36:
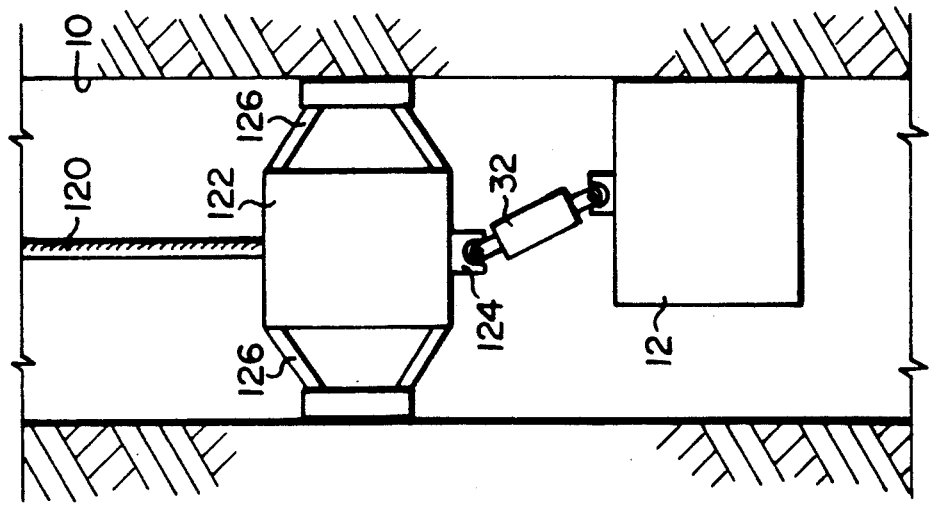
FIG. 36 discloses diagrammatically a method of practicing the invention for generating vibrational energy within a borehole in which the entire system can be positioned into and removed from the borehole, such as on a conventional wireline which can also be a hydraulic line.

As previously described a readily available means of backward whirling a mass in a borehole is by the use of rotational tubing extending from the earth's surface. While the use of tubing is a basic means of rotating a mass in a borehole, the problem with the use of tubing is that it is fairly expense and time consuming since tubing must be run into or removed from a borehole one length at a time, the length being threadably coupled to each other. An alternate arrangement is to run into a borehole from the earth's surface a mechanism to accomplish backward whirling of a mass wherein the whole mechanism is supported on a flexible medium, such as a conventional wireline that includes electrical conductors or a conventional wireline that includes also a hydraulic line. Since a wireline can be wound and unwound from a spool, insertion of the mechanism into or removal of it from a borehole is much more expedient and, therefore, less expensive than is the process of running a length of tubing in and out of a borehole. FIG. 36 shows diagrammatically how the system of this invention may be employed with a flexible line 120 that may be a steel cable providing the necessary strength for supporting the mechanism in combination with electrical conductors or in combination with a hydraulic line. Cable 120 is attached to a rotatory source 122, which can be a motor if the cable has conductors for supplying electrical energy or it can be a hydraulic motor if cable 120 has a hydraulic line as a part thereof. The rotatory source has a shaft 124 extending from the bottom providing rotational energy.

Extending from the rotary source 122 are arms 126, only two sets of which are shown in the elevational view. In the practical application of this concept at least three sets spaced apart would be required for centrally positioning the rotary source in borehole 10. The arms 126 are controllable by electrical conductors that form a part of flexible line 120 so that when the rotary source has been positioned at the selected depth an operator can, by controls from the earth's surface, apply electrical energy to extend the arms 126 lock the rotary source in a non-rotated and supported position within borehole 10.

After the rotary source is locked in position by separate control at the surface, the operator can apply electrical energy to rotary source 122 to rotate shaft 124 or supply hydraulic energy if the rotary source is a hydraulic motor. The rotation of shaft 122 is coupled by linkage 32 to mass 12 to cause it to rotate in the borehole and backward whirl to generate vibrational energy as previously described. The speed of shaft 124 can be varied to change the characteristics of the vibrational energy produced by the backward whirling mass such as for producing seismic signals having different frequency characteristics or for producing vibrational energy for other applications in the borehole.

Figure 37:
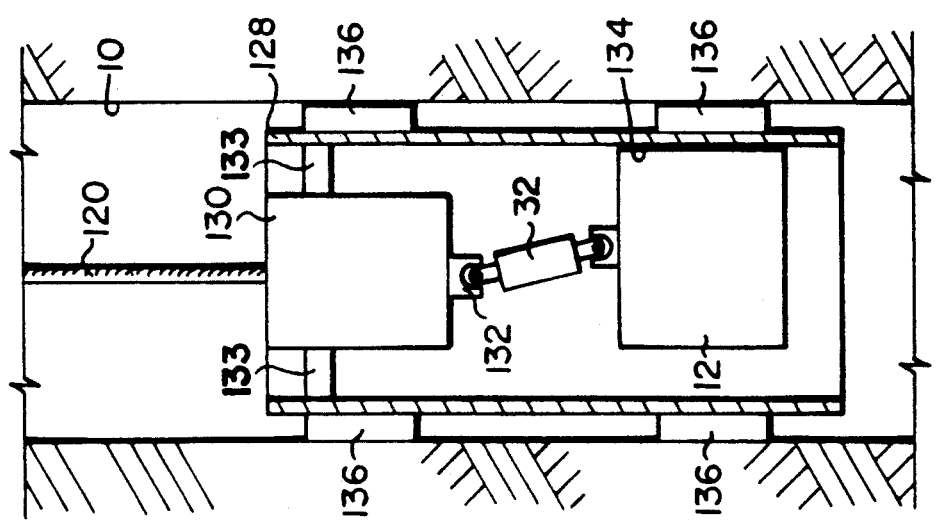
FIG. 37 shows another alternate embodiment of the invention in which the vibrational energy system can be positioned into and removed from a borehole by means of a wireline. In this embodiment a tubular housing is employed with controllable slips for engaging the borehole sidewall. Within the housing is a motor having a shaft extending therefrom connected by a linkage to a rotational mass. The mass rotates within the interior tubular housing to generate vibrational energy.

An alternate embodiment of the concept of FIG. 36 is shown diagrammatically in FIG. 37. In this embodiment a tubular housing 128 having an external diameter less than the diameter of borehole 10 is suspended by a cable 120, the cable providing both physical support and either electrical or hydraulic energy. Housing 128 has within it a rotary source or motor 130 having a shaft 132 extending therefrom connected by linkage 32 to mass 12. Motor 130 is supported within the housing such as by brackets 133 extending between the motor and the interior wall of housing 130. When energy is supplied to motor 130, whether electrical or hydraulic, shaft 132 rotates mass 12 to backward whirl within tubular housing 128, that is, mass 12 backward whirls in the mass interior circumferential surface 134 to generate vibrational energy.

Since the apparatus of FIG. 37 is self-contained, that is, since the rotary source 130 and rotating mass 12 are supported within housing 128 there would be no innate tendency for the housing itself to rotate when rotary source 130 is energized. Vibrational energy will be transmitted to the earth's structure surrounding the borehole by fluid that inevitably fills the borehole in which housing 128 is positioned. However, to more effectively transmit vibrational energy to the surrounding earth and to stabilize the housing 128 in position, the housing may be provided with external slips 136 that can be expanded or contracted. Expandable slips 136 are commonly employed in the petroleum industry. Slips 136 can be expanded or contracted by electrically operated controls actuated from the earth's surface or by hydraulic energy controlled from the earth's surface if cable 120 includes a hydraulic line.

Figure 38:
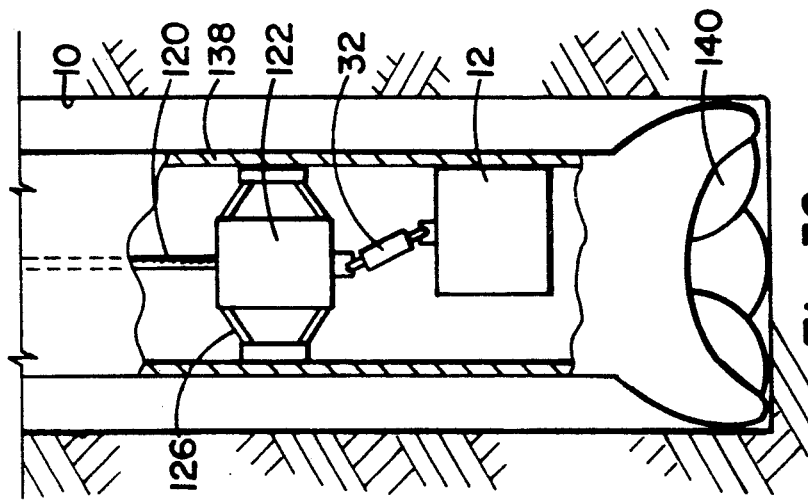
FIG. 38 shows the system of this invention in which the vibrational energy producing source is positionable into and removable from the interior of a drill string. This system is like that of FIG. 36 except that it is dimensioned to fit within the interior of the drill string so that the mass rotates in backward whirling action within the drill string interior to generate vibrational energy that may be used such as a seismic energy source.

The system of FIG. 36 can also be applied internally of a tubular member such as a drill string. FIG. 38 shows a drill string 138 extending from the earth's surface as may be employed to rotate bit 140 at the lower end of the drill string for use in drilling borehole 10. The mechanisms of FIGS. 36 that is, rotary source 122, linkage 32 and backward whirl mass 12 may be positioned into or removed from the interior of the drill string by cable 120, all in the manner previously described. The difference in the arrangement of FIG. 38 with that of FIG. 36 is that in FIG. 38 the components are substantially miniaturized as compared with that of FIG. 36, but the principle of operation is the same. The advantage of the system of FIG. 38 is that it can be run into a drill string for generating vibrational energy without the necessity of pulling the drill string out of the borehole to thereby save considerable time and expense. When, in the process of drilling a well information is required about the geological characteristics through which the bit is passing, such characteristics can be determined using seismic signals generated by means of the whirling mass with the drill string.

The embodiments of FIGS. 10 through 33 along with FIGS. 34 and 35 are illustrative of ways of initiating frictional engagement of a whirling mass within the interior of a borehole. FIG. 27 shows that the geometry of the mass can be changed, such as by making it hollow to change the characteristics of the whirling mass for specific applications. FIGS. 36 through 38 illustrate ways in which the system can be adapted for expeditiously placement in or removal from a borehole when the need for downhole vibrational energy exists.

Figure 40:
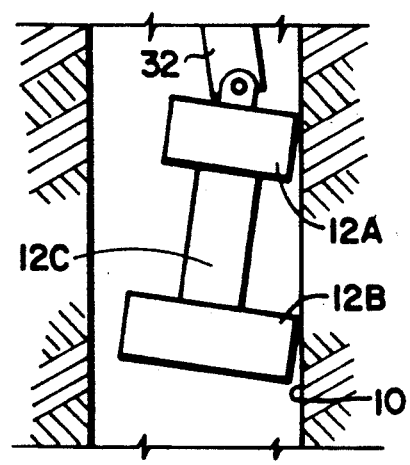
FIG. 40 shows an alternate embodiment of the invention in which the mass has a smaller diameter and a larger diameter portion integrally affixed to each other. Due to the difference in diameters, the portions of the mass backward whirl at different rates to thereby create a more complex vibrational energy pattern that is imparted to the borehole sidewall.

FIG. 40 shows an alternate embodiment of the invention in which the mass has a first portion 12A and a second portion 12B with the portions being of different diameters. Upper portion 12A is of smaller diameter than of lower portion 12B. The portions are integrally connected with an intermediate portion 12C. FIG. 40 is representative only as larger diameter portion 12B can be at top with smaller diameter portion 12A at the bottom. In addition, rather than utilizing a reduced diameter connecting portion 12C the mass can be frustoconical in shape. The importance of the embodiment of FIG. 40 is to illustrate that the mass may have a different diameter in one portion than in the other so that the portions process at different rates of rotation as the mass backward whirls within borehole 10. This different rate of procession will cause the mass to wobble in the borehole as it is backward whirling in response to rotational torque supplied by flexible shaft 32.

In the embodiment of FIG. 40 more complex vibrational energy is generated by the rotating mass. At times the upper and lower portions of the mass contact the same vertical side of borehole 10 concurrently, as illustrated in FIG. 40, so that the applied force against the borehole wall is all in one direction. At a later time, caused by the different rates of procession of the backward whirling portions of the mass, the forces applied against the borehole sidewall will be opposite of each other, that is, wherein the smaller upper portion 12A contacts one side of the borehole wall while substantially the larger diameter portion 12B contacts the opposite side of the borehole wall so that the applied forces are in opposite directions.

The arrangement of FIG. 40 thereby creates a more complex vibrational energy source within the borehole that typically will be desirable only if a more complex vibrational energy source is desired for specific geophysical or other applications.

Figure 41:
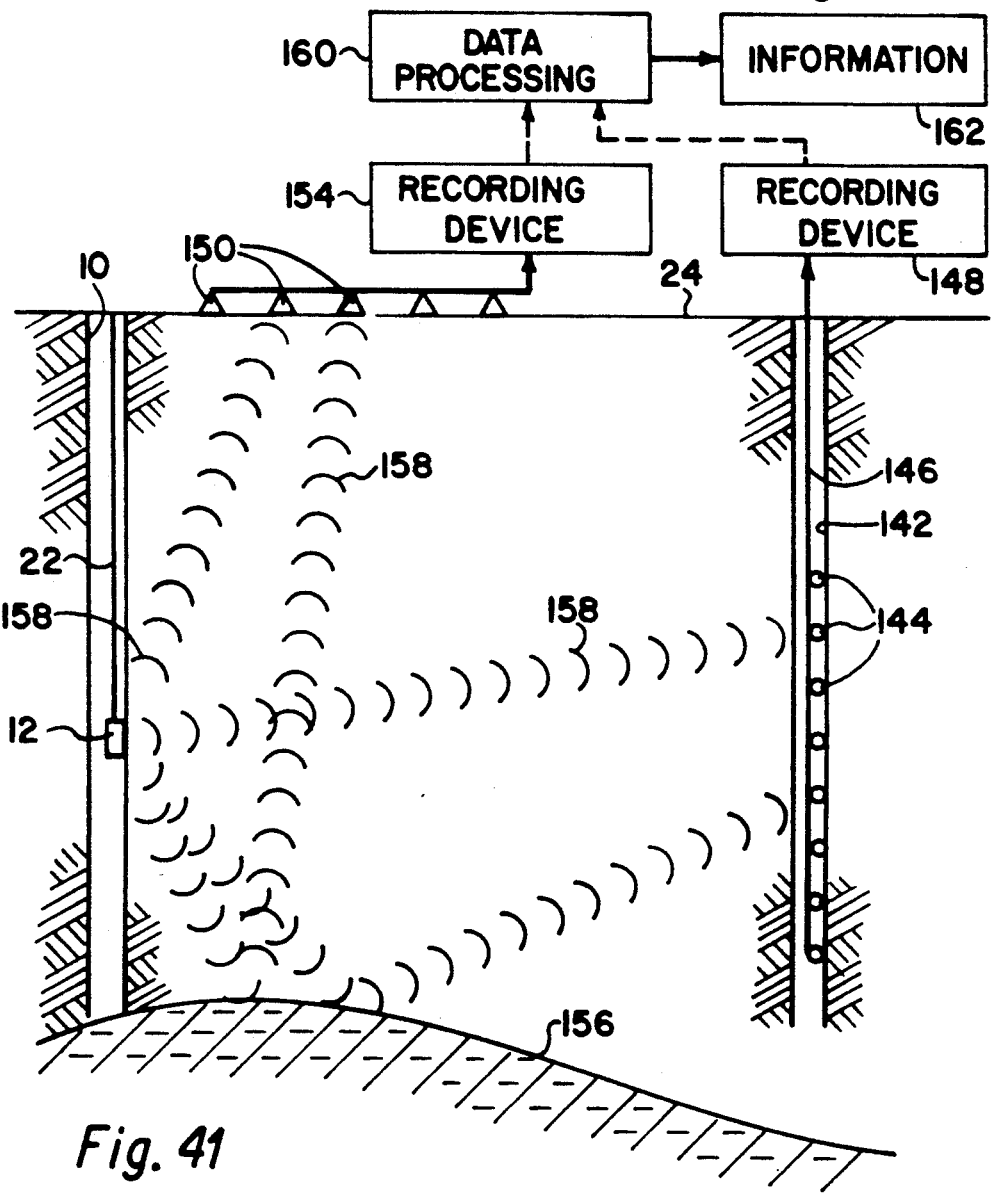
FIG. 41 is an elevational diagrammatic view of a borehole in the earth's surface having means for backward whirling a mass to generate vibrational energy in the borehole and showing a plurality of geophones positioned on the earth's surface and in an adjacent well borehole. This figure further shows representative seismic signals traveling from the backward whirling mass to the geophones, the energy signals being transmitted directly and by reflection from geological strata within the earth. The signals are received by the geophones and resulting electrical signals are conveyed to recording devices. The information on the recording devices can be subsequently analyzed, usually at a remote location where substantial computer facilities are available to obtain a determination of the characteristics of the earth's structure surrounding the borehole having the backward rotating mass therein.

FIG. 41 diagrammatically illustrates an application of the downhole vibrational energy source of this disclosure. The backward whirling mass 12 is illustrated within borehole 10 for operation as has been previously described with reference to FIGS. 1-40. In the arrangment of FIG. 41 there is an offset borehole 142. Positioned within this offset borehole are a plurality of spaced apart geophones 144 suspended on a cable 146 that, above the earth's surface 24, is connected to a recording device 148.

In addition, there is positioned on the earth's surface 24 a plurality of surface geophones 150, spaced apart from each other, and connected by a cable 152 to a recording device 154.

The earth has subsurface strata of varying densities, a strata being indicated by the numeral 156. It is well known that when an energy wave encounters a change in density that a portion of the energy is reflected. Vibrational energy generated by the backward whirling mass 12 within borehole 10 is a source of seismic energy which causes radiation of seismic signals 158. These seismic signals progress in the earth in all directions away from the energy source, only representative directions being indicated in FIG. 41. Some of the seismic signals are transmitted directly in the direction toward the secondary borehole 142 and are received by geophones 144 positioned therein. Other seismic signals are transmitted directly in the direction toward the earth's surface 24 and are received by the surface mounted geophones 150. Still other seismic signals encounter a strata exemplified by 156 and are reflected back both toward the secondary borehole and the earth's surface. Thus, as a consequence of the generation of vibrational energy, seismic signals are generated in the borehole which can be received by geophones in a variety of ways, including the ways illustrated in FIG. 41. The received signals are recorded on the recording devices 148 and 154. The information made available by the recording devices 148 and 154, which can be in the form of information recorded on magnetic tape, magnetic discs or the like, can then be processed to provide valuable information as to the earth's structure in the area surrounding borehole 10.

Data collected in the recording devices 148 and 154, or either of them, is conveyed to a data processing facility 160 which is usually remotely located. The data processing facility 160 typically employs a sophisticated computer system utilizing a sophisticated program. The data which is obtained by reception of the seismic signals generated by the whirling mass is correlated and analyzed in the data processing facility 160 to produce, as an output, information at 162 that enables a geophysicists to understand at least some of the characteristics of the earth's structure adjacent to borehole 10. The data processing equipment 160 may be located far removed from the borehole 10, such as in a completely different part of the world.

The arrangement of FIG. 41 is merely exemplary of one application of the vibrational energy source created by a backward whirling mass in a borehole.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. For use in a borehole having a generally cylindrical wall, an apparatus for generating vibrational energy comprising:
   a mass having a surface of dimension less than the borehole and having a rotational axis;
   means to position said mass in a borehole;
   means to rotate said mass about its rotational axis within the borehole in a selected direction of rotation; and
   means to cause said surface of said mass to establish frictional contact with the borehole wall to thereby cause said mass to backward whirl in the direction opposite to said direction of rotation of said mass, centrifugal force of the whirling mass serving to generate vibrational energy in the borehole.

2. An apparatus for generating vibrational energy in a borehole according to claim 1 wherein said mass has a frictional enhanced area on at least a portion of its said surface.

3. An apparatus for generating vibrational energy in a borehole according to claim 1 wherein said mass is of generally elongated cylindrical configuration having a top and a bottom and wherein said textured frictional enhanced area is in a band adjacent said top.

4. An apparatus for generating vibrational energy in a borehole according to claim 2 wherein said mass is of generally elongated cylindrical configuration having a top and a bottom and wherein said textured frictional enhanced area is in a band adjacent said bottom.

5. An apparatus for generating vibrational energy in a borehole according to claim 2 wherein said mass is of generally barrel shaped configuration with a top and bottom and with the diameter being greater in the middle between the top and bottom and wherein said textured frictional enhanced area is in a band around the middle.

6. An apparatus for generating vibrational energy in a borehole according to claim 1 wherein said mass is of generally elongated cylindrical configuration having an external cylindrical surface and including:
   a circumferential elastomeric member affixed to the exterior of said mass and having a non-compressed diameter for greater than said mass.

7. An apparatus for generating vibrational energy in a borehole according to claim 6 wherein said elastomeric member is configured to fully compress as said mass is urged against the borehole by centrifugal force caused by backward whirling.

8. An apparatus for generating vibrational energy in a borehole according to claim 1 wherein said mass is of generally elongated cylindrical configuration having a top and a bottom and a cylindrical axis, and including:
   a rotary imparting source pivotally attached to said mass at said top is substantially coincidence with said cylindrical axis, and in which said cylindrical mass is of non-uniform density and is therefore unbalanced about said axis of rotation.

9. An apparatus for generating vibrational energy in a borehole according to claim 1 wherein said mass is of generally elongated cylindrical configuration having a top and a bottom and a cylindrical axis and including:
   a rotary imparting source flexible attached at a point of attachment to said mass at said top and wherein the point of attachment is displaced from said cylindrical axis.

10. An apparatus for generating vibrational energy in a borehole according to claim 1 wherein said mass is elongated and has a top and a bottom and has an axis of rotation extending through the top and bottom, and wherein the mass is of generally uniform cross-sectional configuration in all planes taken perpendicular to the axis of rotation, such uniform cross-sectional configuration being non-circular.

11. An apparatus for generating vibrational energy in a borehole according to claim 10 wherein said mass generally uniform cross-sectional configuration is elliptical.

12. An apparatus for generating vibrational energy in a borehole according to claim 1 wherein said mass is elongated and has a top and a bottom and including:
   a rotational means in the borehole having a downwardly extending shaft that is supported generally co-axially within the borehole;
   a linkage pivotally affixed at one end to said shaft and pivotally affixed at the other end to said top of said mass; and
   torsional spring means interposed between said shaft and said linkage to urge said linkage to extend at an angle to said shaft and to thereby urge said mass into frictional engagement with the borehole.

13. An apparatus for generating vibrational energy in a borehole according to claim 1 wherein said mass is elongated and has a top and a bottom, and said mass has a center of gravity that is below said top; and a flexible rotary imparting source pivotally attached to said mass at said top at a point of pivotation, the point of pivotation being above said mass center of gravity.

14. An apparatus for generating vibrational energy in a borehole according to claim 1 wherein said mass is elongated and has a top and a bottom and a center of gravity intermediate the top and bottom, and wherein the mass has a cavity therein communicating with the top, and including:
   a flexible rotary imparting member pivotally attached at a point of pivotation to said mass, the point of pivotation being within said cavity and adjacent said mass center of gravity.

15. An apparatus for generating vibrational energy in a borehole according to claim 14 wherein said point of pivotation is within said cavity and spaced either above or below said mass center of gravity.

16. An apparatus for generating vibrational energy in a borehole according to claim 1 wherein said mass is elongated and has a top and a bottom including:
   a flexible rotary imparting member pivotally attached at a point of pivotation on said top of said mass, and wherein the center of gravity of said mass is closer to said bottom than to said top.

17. An apparatus for generating vibrational energy in a borehole according to claim 16 wherein the center of gravity of said mass is closer to said top than said bottom.

18. An apparatus for generating vibrational energy in a borehole according to claim 16 wherein said mass has an external, generally cylindrical surface and wherein said means to cause said mass to establish frictional contact with the borehole wall comprises:
   a band formed on said mass external surface configured for enhanced frictional engagement with the borehole.

19. An apparatus for generating vibrational energy in a borehole according to claim 16 wherein said mass is formed of an upper and a lower portion, the material of which the lower portion is formed being denser than the material of which the upper portion is formed.

20. An apparatus for generating vibrational energy in a borehole according to claim 19 wherein said means to cause said mass to establish frictional contact with the borehole wall comprises:
   a band of textured frictional enhanced area around said mass.

21. An apparatus for generating vibration energy in a borehole according to claim 17 wherein said mass is formed of an upper and a lower portion, the material of which the upper portion is formed being denser than the material of which the lower portion is formed.

22. An apparatus for generating vibrational energy in a borehole according to claim 21 wherein said means to cause said mass to establish frictional contact with the borehole wall comprises:
   a band of textured frictional enhanced area around said mass.

23. An apparatus for generating vibrational energy in a borehole according to claim 1 wherein said mass is elongated and has a top and a bottom and wherein said means to establish frictional contact of said surface of said mass with the borehole comprises:
   a plurality of separate frictional enhancement members radially displacably secured to said mass each being moveable between first radially outwardly extending position wherein portions of said members extend radially outwardly beyond said mass surface and wherein each of said frictionally enhancement members is radially inwardly displacable relative to said mass surface when said mass is forced against the borehole.

24. An apparatus for generating vibrational energy in a borehole according to claim 23 including:
   spring means normally resiliently biasing said frictional enhancement members radially outwardly relative to said mass.

25. An apparatus for generating vibrational energy in a borehole according to claim 1 wherein said means to rotate said mass about its rotational axis includes, in part, a flexible shaft attached at one end to said mass to thereby permit said mass to freely backward whirl in contact with the borehole wall.

26. An apparatus for generating vibrational energy in a borehole according to claim 1 wherein said mass has an upper and a lower portion each of generally cylindrical external configuration taken in a plane perpendicular to said rotational axis, and wherein said upper and lower portions are of different diameters.

27. For use in a borehole having a generally cylindrical wall, an apparatus for generating vibrational energy comprising:
   a rotary source positionable within a borehole and having a bottom end having a rotatable shaft extending therefrom;
   means to removably suspend said rotary source to a selected position in a borehole;
   means to retractably and non-rotatably secure said rotary source at said selected position in a borehole;
   a mass having an axis of rotation and having a surface of dimensions less than the borehole and having a rotational axis; and
   flexible coupling means connecting said mass to said rotary source shaft whereby said mass may be rotated about said axis of rotation by the rotary source in a selected direction of rotation to cause said mass surface to establish frictional contact with the borehole to thereby cause said mass to backward whirl in the direction opposite to said direction of rotation, centrifugal force of the backward whirling mass serving to generate vibrational energy in the borehole.

28. An apparatus for generating vibrational energy in a borehole according to claim 26 wherein said means to removably suspend said rotary source to a selected position in a borehole is a wireline.

29. An apparatus for generating vibrational energy in a borehole according to claim 26 wherein said means to removably suspend said rotary source to a selected position in a borehole is a hydraulic line.

30. An apparatus for generating vibrational energy in a borehole according to claim 26 wherein said means to retractably and non-rotatably secure said rotary source at a selected position in a borehole including a plurality of spaced apart retractable radially extending arms.

31. For use in a borehole having a generally cylindrical wall, an apparatus for generating vibrational energy, comprising:
   a housing of external diameter less than that of the borehole, the housing having a portion thereof providing an internal cylindrical surface;
   means to removably suspend said housing to a selected position in the borehole;

means to retractably and non-rotatably secure said housing at said selected position in a borehole;

a rotary source positioned with and supported to said housing and having a retractable shaft extending therefrom;

a mass having an external surface of dimension less than said internal cylindrical surface of said housing and having an axis of rotation;

flexible coupling means connected between said rotary source shaft and said mass whereby said mass may be rotated about its axis of rotation in a selected direction of rotation to cause said mass surface to establish contact with said housing internal cylindrical surface to cause said mass to backward whirl in the direction opposite to said direction of rotation, centrifugal force of the backward whirling mass serving to generate vibrational energy in said housing, which vibrational energy is transferred to the borehole.

32. A system for generating vibrational energy in a drill string in which the drill string has a cylindrical interior surface extending downwardly to a drill bit at the lower end thereof, the drill string and bit being positioned in a borehole, comprising:

a rotary source positionable within the cylindrical interior of a drill string and having a bottom end having a rotatable shaft extending therefrom;

a mass having an axis of rotation and having a surface of dimension less than the borehole and having a rotational axis;

flexible coupling means connecting said mass to said rotary source shaft whereby said mass may be rotated about said axis or rotation in a selected direction of rotation to cause said mass surface to establish frictional engagement with the drill string cylindrical interior surface to thereby cause said mass to backward whirl in the direction opposite to said direction of rotation, centrifugal force of the backward whirling mass serving to generate vibrational energy in the drill string.

33. A system for generating vibrational energy in a drill string according to claim 31 including:

means to removably suspend said rotary source and said mass to a selected position in a drill string; and means to retractably and non-rotatably secure said rotary source at said selected position in the drill string.

34. A system for generating vibrational energy in a drill string according to claim 32 wherein said means to removably suspend said rotary source and said mass to a selected position in a drill string is a wireline.

35. A system for generating vibrational energy in a drill string according to claim 32 whereby said means to retractably and non-rotatably secure said rotary source at a selected position in a drill string includes a plurality of spaced apart retractable radially extending arms.

36. A method of obtaining information indicative of the earth's structure adjacent a borehole that extends from the earth's surface, the borehole having a generally cylindrical wall, comprising:

positioning a mass having a rotational axis in a borehole, the mass having an external surface of dimension less than the borehole;

rotating the mass about its rotational axis in a selected direction in the borehole and causing the surface of the mass to contact the borehole wall to thereby cause the mass to backward whirl in the borehole in the direction opposite to said direction of rotation of the mass, centrifugal force of the backward whirling mass serving to generate vibrational energy that is radiated in the earth as a seismic signal;

positioning at least one geophone in contact with the earth at a location remote from said rotating mass for receiving a seismic signal resulting from vibrational energy generated by the backward whirling mass;

collecting data generated by said at least one geophone; and processing the collected data to provide information indicative of the earth's structure adjacent the borehole.

37. A method according to claim 36 including:

forming an offset borehole in the earth spaced from the first mentioned borehole and positioning at least one geophone in the offset borehole for receiving a seismic signal resulting from vibrational energy generated by the backward whirling mass.

38. A method according to claim 36 wherein said step of positioning at least one geophone in contact with the earth includes positioning said at least one geophone in contact with the earth's surface adjacent to the borehole.

39. A method according to claim 36 wherein said step of processing said collected data to provide information indicative of the earth's structure adjacent the borehole is carried out at a location remote from the borehole.

* * * * *